US010453012B2

(12) United States Patent
Watkins et al.

(10) Patent No.: US 10,453,012 B2
(45) Date of Patent: Oct. 22, 2019

(54) EVALUATING COMMUNICATIONS FEATURE UTILIZATION

(71) Applicants: John Hanmer Watkins, Ottawa (CA); Natalie Courtenay, Ottawa (CA); James McCoy, Ottawa (CA)

(72) Inventors: John Hanmer Watkins, Ottawa (CA); Natalie Courtenay, Ottawa (CA); James McCoy, Ottawa (CA)

(73) Assignee: Mitel Networks Corporation, Ottawa Ontario (CA)

( * ) Notice: Subject to any disclaimer, the term of this patent is extended or adjusted under 35 U.S.C. 154(b) by 1111 days.

(21) Appl. No.: 14/487,324

(22) Filed: Sep. 16, 2014

(65) Prior Publication Data
US 2016/0078382 A1    Mar. 17, 2016

(51) Int. Cl.
| | |
|---|---|
| *G06Q 10/06* | (2012.01) |
| *H04L 12/26* | (2006.01) |
| *H04W 48/18* | (2009.01) |
| *G06Q 30/00* | (2012.01) |

(52) U.S. Cl.
CPC ..... *G06Q 10/06315* (2013.01); *G06Q 30/018* (2013.01); *H04L 43/04* (2013.01); *H04L 43/065* (2013.01); *H04W 48/18* (2013.01)

(58) Field of Classification Search
CPC ...... H04L 43/04; H04L 43/065; H04W 48/18; G06Q 30/018
USPC ...................................................... 705/7.25
See application file for complete search history.

(56) References Cited

U.S. PATENT DOCUMENTS

| | | | | |
|---|---|---|---|---|
| 7,620,807 B1* | 11/2009 | Spatscheck | ............. | H04L 47/10 370/400 |
| 7,669,193 B1* | 2/2010 | Chipman | ................ | G06F 8/433 717/146 |
| 8,204,809 B1* | 6/2012 | Wise | ...................... | G06Q 40/06 705/35 |
| 8,635,590 B1* | 1/2014 | Ogilvie | ............... | G06F 9/44521 717/110 |
| 8,930,412 B2* | 1/2015 | Nelson | ................ | G06F 17/3089 705/7.25 |
| 10,158,499 B2* | 12/2018 | Sakata | .................... | G06Q 10/20 |
| 2008/0126158 A1* | 5/2008 | Notea | ................. | G06F 11/3447 705/7.22 |
| 2012/0004975 A1* | 1/2012 | Satyavolu | .............. | G06Q 30/02 705/14.27 |

(Continued)

*Primary Examiner* — Johnna R Loftis (57) ABSTRACT

Methods, systems, and apparatus, including computer programs encoded on a computer storage medium, for evaluating the utilization of communications features. In one aspect, a method includes identifying, for a particular organization, a set of communications features that are included in a communications service that is provided to the particular organization. Usage levels of communications features by members of the organization are determined. Based on the usage levels a determination is made that the at least one of the communications features is being underutilized. An updated set of communications features that removes the at least one of the communications features from the communications service that is provided to the particular organization is selected. Data that changes the set of communications features provided to the particular organization based, at least in part on the updated set of communications features are generated.

20 Claims, 4 Drawing Sheets

(56) References Cited

U.S. PATENT DOCUMENTS

| | | | |
|---|---|---|---|
| 2012/0005177 A1* | 1/2012 | Bao | H04L 43/065 |
| | | | 707/705 |
| 2012/0137001 A1* | 5/2012 | Ferris | H04W 4/003 |
| | | | 709/226 |
| 2012/0226808 A1* | 9/2012 | Morgan | G06F 9/5072 |
| | | | 709/226 |
| 2013/0007761 A1* | 1/2013 | O'Sullivan | G06F 17/30312 |
| | | | 718/104 |
| 2013/0085892 A1* | 4/2013 | Golden | G06Q 30/06 |
| | | | 705/26.62 |
| 2013/0132854 A1* | 5/2013 | Raleigh | G06F 3/0482 |
| | | | 715/738 |
| 2014/0136295 A1* | 5/2014 | Wasser | G06Q 10/06312 |
| | | | 705/7.38 |
| 2014/0341116 A1* | 11/2014 | Chen | H04W 24/10 |
| | | | 370/328 |

* cited by examiner

EVALUATING COMMUNICATIONS FEATURE UTILIZATION

BACKGROUND

This specification relates to data processing and evaluation of communication feature utilization.

Communications features or services are often sold in "bundles." For example, a unified communications provider may offer several different bundles that each provide different combinations of features, such as instant messaging features, telephony features, video conferencing features, and/or data sharing features.

SUMMARY

In general, one innovative aspect of the subject matter described in this specification can be embodied in methods that include the actions of identifying, for a particular organization, a set of communications features that are included in a communications service that is provided to the particular organization; determining, for a time period and for each of one or more communications features in the set, a usage level of the communications feature by members of the organization; determining, based on the usage level of at least one of the one or more communications features being less than a specified level, that the at least one of the communications features is being underutilized; selecting, based on the determination that the at least one of the communications features is being underutilized, an updated set of communications features that removes the at least one of the communications features from the communications service that is provided to the particular organization; and changing the set of communications features provided to the particular organization based, at least in part on the updated set of communications features. Other embodiments of this aspect include corresponding systems, apparatus, and computer programs, configured to perform the actions of the methods, encoded on computer storage devices.

These and other embodiments can each optionally include one or more of the following features. Methods can include the actions of generating report data, for each of the one or more communications features, that cause presentation of a visual indication of the usage level of the communications feature; and providing the report data to the particular organization.

Determining a usage level can include determining, for a particular communications feature, a portion of the members of the organization that have utilized the particular communications feature at least a specified amount of time. Determining that the at least one of the communications features is underutilized can include determining that the particular communications feature is underutilized based on a determination that more than a specified portion of the members of the organization utilize the particular communications feature less than the specified amount.

Methods can include the actions of providing, prior to selecting the updated set of communications features and based on the determination that the particular communications feature, instructional materials that provide instructions on how to utilize the particular communications feature.

Determining that the at least one of the communications features is underutilized can include determining, for the particular organization, an adoption rate of a particular communications feature; identifying, for the particular communications feature, an industry adoption rate specifying an aggregate adoption rate for other organizations that are in a same industry as the particular organization; and determining, based on the adoption rate being less than the aggregate adoption rate, that the particular communications feature is underutilized by the particular organization.

Methods can include the actions of determining that the underutilization of the particular communications feature is due to a malfunction of the particular communications feature within the particular organization; and reporting the malfunction.

Methods can include the actions of determining that one or more communications features, not included in the communications service provided to the particular organization, are utilized by more than at least a threshold number of other organizations that are similar to the particular organization; and suggesting, for inclusion in the communications service provided to the particular organization, at least one of the one or more communications features.

Particular embodiments of the subject matter described in this specification can be implemented so as to realize one or more of the following advantages. Information regarding the utilization of communications services can be used by communications service providers to suggest more optimal or customized bundles of communications features based on historical utilization of the features by a particular organization or industry. Communications service providers can provide their customers with additional value by suggesting changes to their service level when utilization information indicates that one or more features have a low or high utilization rate. Organizations can be provided information regarding the level of adoption of various communications features within the organization to evaluate the value of the communications features. Communications service providers (or organizations that have a telecommunications infrastructure) can prioritize enhancements to various features based on the level of utilization of those features and/or whether the goal to increase utilization of a particular feature or increase functionality of a highly utilized feature will provide more utility to the organization. The causes of errors or malfunctions with various communications features can be identified to reduce the number of errors or malfunctions associated with telecommunications services.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes the evaluation of communications feature utilization. Organizations (e.g., individuals, companies, or other groups of users) purchase communications services to facilitate communications between people, collaboration on projects, and to facilitate the efficient and effective exchange of information. However, it can be difficult for organizations to evaluate which features of the purchased communications services are being utilized and which, if any, are being underutilized. It can also be difficult for organizations to determine when to adopt additional features that are included in the organizations adoption roadmap. This makes it difficult for organizations to make decisions regarding whether to make changes to their communications services and/or which changes to make.

The techniques described in this document identify, for an organization, communications features that may be underutilized by their members (e.g., employees) and/or suggest changes that can be made to enhance the value that the communications services provide to the organization. For example, a suggestion can be provided to the organization to remove an underutilized feature from the set of communications features that are included in their communications service. Likewise, a suggestion can be provided to the organization to add a communications feature that is used by a large number of similar organizations. Additionally, report data can be provided to the organization informing the organization the extent of the use of each communications feature by members of the organization.

The description throughout this document refers to an analytics apparatus that obtains usage data related to usage of various communications features that are provided by a communications service provider. The description is also applicable, and the techniques disclosed can be used, by an organization that provides its own information technology and/or communications infrastructure. For example, these types of organizations can use the feature utilization analysis described in this document to prioritize which communications features to add to their infrastructure, prioritize feature enhancements based on level of utilization, and/or prioritize additional equipment purchases (e.g., based on utilization levels or adoption rates).

The description refers to malfunction and underutilization of a particular feature or features. It should be appreciated that there are multiple situations in which a particular feature(s) may not work properly for the user. For example, the network may not be capable of supporting a feature or a feature on a particular end user device (e.g., the feature is available on a desktop phone but not on a mobile device) but the user selects to use the mobile device anyway knowing (or unknowingly) that an underutilization of the feature is likely to occur. In another situation, there may be a malfunction in the service, network or device which prohibits a particular feature from working properly.

Figure 1:
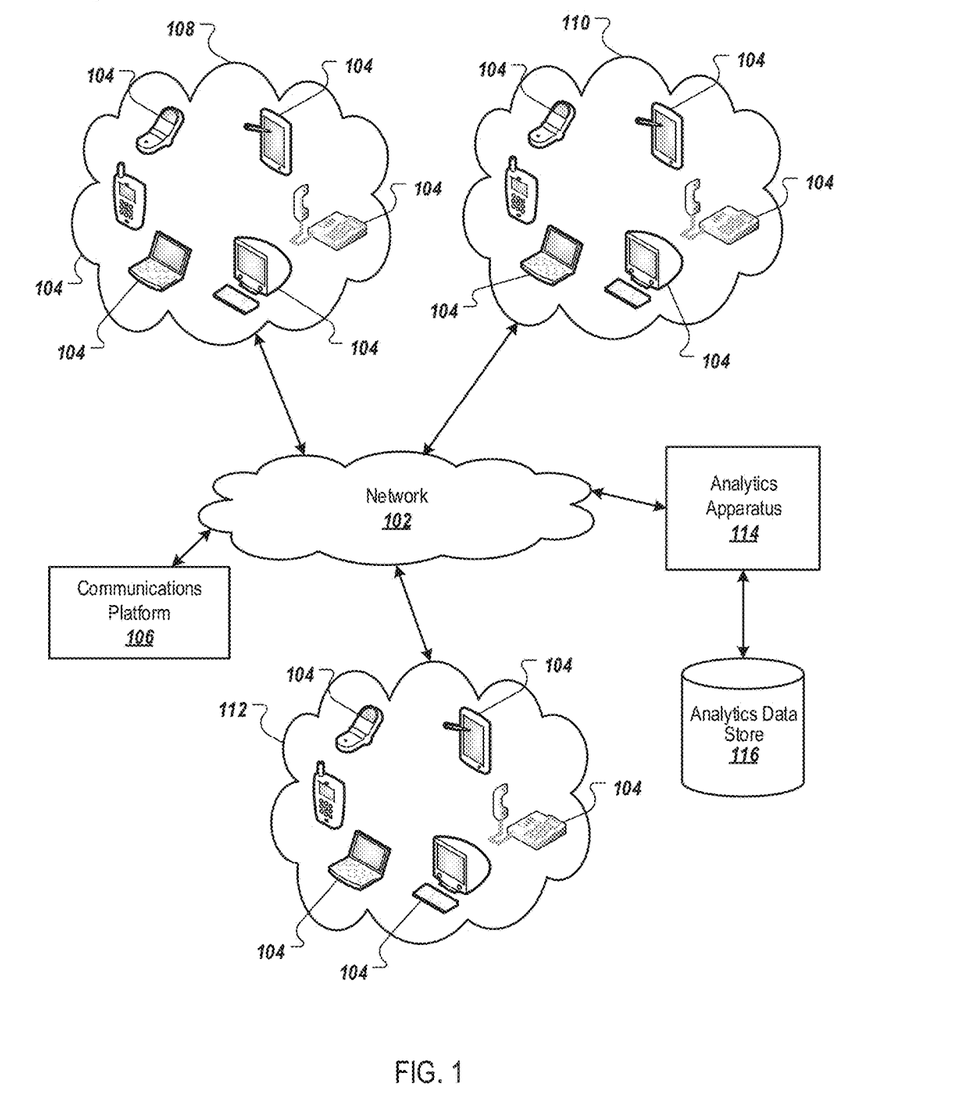
FIG. 1 is a block diagram of an example environment in which communications services are provided.

FIG. 1 is a block diagram of an example environment 100 in which communications services are provided. The example environment 100 includes a network 102, such as a local area network (LAN), a wide area network (WAN), the Internet, or a combination thereof. The network 102 connects user devices 104 to a communications platform 106. The example environment 100 can include many different user devices and/or communications platforms 106. For brevity and clarity, this document will refer to only one communications platform 106.

A user device 104 is an electronic device that is capable of receiving and transmitting data over the network 102. Example user devices 106 include Internet Protocol (IP) telephones, personal computers, mobile communication devices (e.g., Smartphones, tablet computing devices, or other communications devices that communicate over a mobile or wireless network), and other devices that can send and receive data over the network 102. A user device 106 typically includes a user application, such as a communications application and/or or a web browser, to facilitate the sending and receiving of data over the network 102.

The communications platform 106 provides communications services to user devices 104 over the network 102. For example, the communications platform 106 can provide telephony services (e.g., voice calls and/or video calls, secure access and compliance reporting), data storage services (e.g., cloud storage), and collaboration services (e.g., whiteboard sharing capabilities, web conferencing capabilities, instant messaging capabilities, audio web and video conferencing, user presence, interaction recording, and secure access), as well as other data services (e.g., e-mail, voicemail, and fax services) and call center services (e.g., automatic call distribution and predictive outbound dialing). The communications platform 106 can include, for example, a server that executes a communications application to provide the communications services that are available to the user devices 104 and integrates with networks and organization's business applications.

In some implementations, the communications platform 106 provides communications services to various organizations, such as organizations 108, 110, and 112. As used in this document, an organization is an entity that obtains communications services for multiple user devices 104. For example, an organization can be a company that obtains communications services for its various employees. Generally, an organization is obtaining the communications services to facilitate effective communication and collaboration among employees, partners and customers. To facilitate collaboration, an organization can request various communications services from the communications platform to enable the organization's employees and/or customers to communicate in various ways.

The services that a particular organization requests may depend, for example, on the type of business that the organization is engaged in, the types of user devices that are used by the organizations employees, the services that the organization provides, and/or where and/or how the organization's employees work. For example, an organization (e.g., organization 108) that has employees that travel much of the time may request communications services such as cloud storage/computing services, short messaging services (SMS), and/or mobile video conferencing or shared whiteboard capabilities for mobile devices, while another organization (e.g., organization 110) that has employees that spit work time between a primary office space and home may request communications services such as multi-ring capabilities, number porting, call forwarding, and remote desktop computing capabilities. As another example, an organization (e.g., organization 112) that has a combination of traveling employees, work at home employees, and in-office employees that all need to collaborate on the same projects may request a full suite of communications services provided by the communications platform 106 in an effort to provide each of the different types of employees with the tools needed to be most efficient.

Due to the number of various services that an organization can obtain from the communications platform 106 and the various needs of different organizations, it can be difficult for an organization to determine which set of communications services should be obtained from the communications platform 106. In an effort to simplify the selection of communications services by organizations, some communications service providers (e.g., entities that manage and/or operate the communications platform) offer a limited number of "bundles" of communications services. For example, a particular communications service provider may offer five different bundles of communications services that have been created for different types and/or sizes of organizations and user types.

Bundling communications services simplifies the process of selecting a set of communications services that an organization will purchase, but once an organization selects a bundle, the organization may not have the ability to determine whether, or to what extent, the organization's employees are utilizing the services included in the bundle. For example, if an organization obtains a bundle that includes remote whiteboard capabilities on a mobile device, the organization may not be able to determine which, if any, users have used the remote whiteboard capabilities, how frequently the remote whiteboard capabilities are used, or from which devices the whiteboard capabilities are being accessed. The lack of an organizations ability to evaluate the scope and frequency with which different communications services are utilized makes it difficult for organizations to evaluate the value that the communications services are providing and/or whether different, fewer, or more communications services should be requested from the communications platform. Another challenge to determine utility of various communications features is the difficulty in distinguishing lack of feature availability due to an incompatible user device and/or network, and an automatic restriction by the communications server versus a fault in the communications server, network and/or device. Users may choose to communicate and collaborate on a device or over a network knowing that a particular feature may not be available, for example when the user chooses portability over feature availability.

The environment 100 includes an analytics apparatus 114 that is configured to evaluate the utilization of various communications services by an organization, provide reports regarding the utilization, and/or suggest changes to the services provided to the organization. As described in more below with reference to FIGS. 2 and 3, the analytics apparatus 114 can monitor the use of each particular communications service by each user device 104 and store data regarding the use in an analytics data store 116. As data is collected over time, the analytics apparatus 114 can determine adoption rates for various communications services (e.g., what portion of an organizations users are utilizing each of the various communications services), evaluate peak and average usage measures for the various communications services, and compare these adoption rates and/or usage measures to benchmark values to provide insight as to how the various communications features are being utilized by the organization and whether action should be taken to increase utilization or a different set of communications features should be selected.

Figure 2:
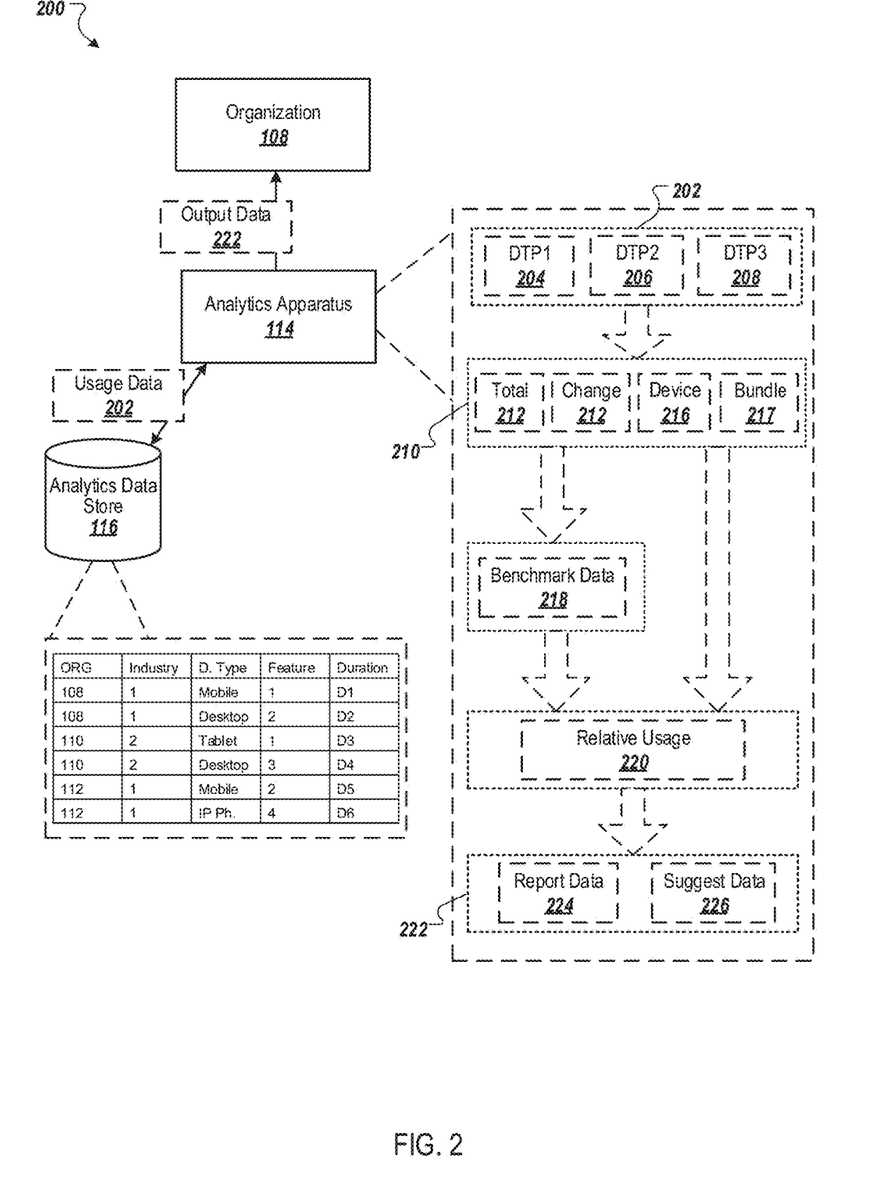
FIG. 2 is a block diagram of an example data flow for evaluating the utilization of communications features.

FIG. 2 is a block diagram of an example data flow 200 for evaluating the utilization of communications services for an organization. The data flow 200 begins with the analytics apparatus 114 obtaining usage data 202 for a particular organization (e.g., organization 108). In some implementations, the analytics apparatus 114 obtains the usage data 202 from the analytics data store 116. As discussed above, the analytics data store 116 can store, for each of multiple organizations, usage data including, for example, which communications features have been used, on what type of communications device the communications features have been used, and a duration (or frequency) of the use of the communications features.

The data indexed in the analytics data store 116 can also include data representing characteristics of the organizations for which the usage data has been obtained. For example, information such as the industry to which the organization is classified (e.g., specified by Standard Industrial Classification ("SIC") code or another coding scheme) or other information (e.g., number of employees or geographic locations of offices for the organization) can also be stored in the analytics data store 116.

The usage data 202 for each organization can be indexed according to the organization ("ORG") to which the usage data 202 corresponds. For example, as shown in FIG. 2, the analytics data store 116 can store usage data for each of organization 108, organization 110, and organization 112. The usage data 202 for each of these organizations can be stored in association with a reference to the organization to which the usage data corresponds. For instance, the usage data 202 stored with a reference to organization 108 includes data specifying that organization 108 is an industry represented by the number "1," a mobile device (e.g., D. Type of mobile) utilized a feature represented by the number "1" for a duration of "D1," and that a desktop device utilized a feature represented by the number "2" for a duration of "D2."

Similarly, in this example, the usage data stored with a reference to organization 110 includes data specifying that organization 110 is in an industry represented by the number "2," a tablet device utilized the feature represented by the number "1" for a duration of "D3," and that a desktop device utilized a feature represented by the number "3" for a duration of "D4." Continuing with this example, the usages data 202 stored with a reference to organization 112 includes data specifying that organization 110 is in the industry represented by the number "1," a mobile device utilized the feature represented by the number "2" for a duration of "D5," and that an IP Phone (e.g., D. Type IP Ph.) utilized a feature represented by the number "4" for a duration of "D6."

In some implementations, the usage data 202 also includes timestamps specifying when each of the specific portions of usage data was obtained. For example, each entry in the analytics data store 116 can include a timestamp indicating when use of the particular feature was initiated. Using timestamps, the analytics apparatus 114 can delineate (or segment) the usage data 202 based on different time periods during which the usage data were generated and/or collected. For example, the analytics apparatus 114 can group together or segment data for a first time period (e.g., a first month) into DTP1 204. Similarly, the analytics apparatus 114 can group together or segment data for a second time period (e.g., a second month that is after the first month) into DTP2 206, and group together or segment data for a third time period (e.g., a third month that is after the second month) into DTP3 208. Segmenting or grouping the usage data 202 according to time periods facilitates direct comparison between the usage of communications features from one time period to the next.

In some implementations, the analytics data store 116 can also store other types of data related to the usage of the features and/or the device on which the features were used. For example, the usage data 202 can include data specifying a device identifier that uniquely identifies the device from which the usage data 202 was obtained, a software or firmware version that is installed on the user device, and/or a user identifier corresponding to a user that is logged in at (or otherwise associated with) the user device from which the usage data 202 was obtained. This information can be stored, for example, in the analytics data store 116.

In some implementations, the usage data 202 received from a particular user device and/or organization can be indexed according, or stored with a reference to, the service bundle type to which the user device and/or organization is subscribed. This enables the analytics apparatus 114 to segment the data (e.g., data in DTP1) according to bundle type.

Additionally, or alternatively, the usage data 202 can be collected and/or indexed according to each particular user in the organization. For example, for each particular user that is authorized to use a particular bundle of features, the usage data 202 can indicate which features were utilized by that particular user and from which type of user device the features were utilized. In a particular example, the usage data 202 may specify that a particular user utilized a first feature from each of a desktop device, a tablet device, and a mobile phone, while the usage data 202 may indicate that the same user may have only accessed a second feature once using a mobile device, but regularly utilized the second feature using a desktop device. The usage data 202 can also specify a connection type or network from which the features were utilized. Continuing with the example above, the usage data 202 can specify that the particular user was connected to a high-speed network connection (e.g., DSL, wireless hotspot, or T1 network) each time the first feature was utilized.

The analytics apparatus 114 analyzes the usage data 202 to determine a set of usage level measures 210 (also referred to as "usage levels") of various communications features by the organization 114 and/or relative to a particular bundle subscription type. For example, the analytics apparatus 114 can determine a total adoption rate ("Total") 212 that specifies a portion (e.g., percentage) of users in the organization (and/or bundle subscription type) that have utilized each communications feature to date. In some implementations, the total adoption rate 212 for a particular communications feature can be determined based on a number of users in the organization that have ever utilized the particular communications feature relative to (e.g., divided by) a total number of users that are authorized to utilize the particular communications feature ("authorized users"). In some implementations, the total adoption rate 212 for the particular communications feature can be determined based on a number of users that utilize the communications feature for at least a specified duration (or number of times) in each month relative to the total number of authorized users.

The analytics apparatus 114 can also analyze the usage data 202 to determine a periodic usage change ("change") 214 for each of the communications features. For example, the analytics apparatus 114 can determine on a monthly basis (or another specified periodic interval) a change in the portion (e.g., percentage or absolute number) of users in the organization 114 that have utilized a particular communications feature. As discussed above, the users that are considered to have utilized a particular communications feature for purposes of determining the periodic usage change 214 for a particular communications feature can be any users that have utilized the particular communications feature during a particular time period, or limited to only those users that utilized the particular communications feature for at least a specified duration (or number of times) during the time period.

In some implementations, the analytics apparatus 114 determines one or more per-device type usage level measures ("Device") 216. These per-device usage level measures 216 can specify, for each different device type (e.g., mobile, desktop, tablet, or IP Phone) various measures of usage. For example, the various measures of usage can include a total adoption rate of users of each type of device, a periodic usage change among users of each device type, a peak usage (e.g., a maximum number of simultaneous users) among users of each device type, an average usage (e.g., average usage duration or average number of simultaneous users) among users of each device type, or any other appropriate usage measures. Of course, other usage measures or other information can be determined based on the usage data, but for brevity, the remainder of the document will refer to these examples.

The per-device usage level measures 216 can help identify whether usage of a particular communications feature with a particular device is substantially lower than other types of devices, which may reveal an incompatibility with a particular type of device, and/or network, or some other issue that is preventing users from utilizing the particular communications feature. For example, poor network availability and/or capacity, or poor quality of service (e.g., poor voice quality) may result in the communications server restricting the availability of a particular feature or the users may choose not to utilize a feature (e.g., poor quality) that requires higher levels of network availability or good quality of service in order to provide a good user experience. If usage on a particular type of device is deemed particularly low, event logs, which include data regarding error messages, response times, device restrictions, and other performance information, can be evaluated to determine what the low utilization may be attributed to, e.g., a performance issue with the device, network or server, or underutilization due to user choice. In turn, a report specifying one or more potential causes of low (or zero) utilization feature can be provided to the organization.

In some implementations, the analytics apparatus 114 can provide a portability report for one or more features that are included in a bundle. The portability report can specify, for example, a range of devices and/or networks from which users have accessed each of the features, which can be used to evaluate the ability of users in the organization to utilize the communications features across various devices and across various types of networks or network connections.

In some implementations, the analytics apparatus 114 determines one or more per-bundle-type usage level measures ("Bundle") 217. These per-bundle-type usage level measures 217 can specify, for each different bundle type various measures of usage. For example, the various measures of usage can include a total adoption rate of various features offered in each bundle type, a periodic usage change in feature usage among users subscribed to each bundle type, a peak usage (e.g., a maximum number of simultaneous users) among users subscribed to each bundle type, an average usage (e.g., average usage duration or average number of simultaneous users) among users subscribed to each bundle type, or any other appropriate usage measures on a per-bundle-type basis.

The per-bundle-type usage level measures 217 can help identify whether usage of a particular communications feature within a particular bundle type is relatively low or high, which may reveal an opportunity to create a customized bundle (e.g., by removing a particular feature from the bundle, adding a feature to the bundle, or suggesting a different bundle).

The usage level measures that are determined by the analytics apparatus 114 can utilize other subsets of the usage data 202. For example, an organization may want to evaluate the utility of a particular feature independent of devices or network limitations that restrict effective use of the feature.

The analytics apparatus 114 obtains benchmark data 218. The benchmark data 218 are data against which one or more of the usage measure levels in the set of usage measure levels 210 can be compared to obtain relative usage level measures 220. For example, the benchmark data 218 can include a benchmark total adoption rate, a benchmark periodic usage change, benchmark per-device usage level measures, or benchmark per-bundle-type usage level measures 217 against which the total adoption rate 212, periodic usage change 214, the per-device usage level measures 216, or per-bundle-type usage level measures can be compared to evaluate whether the usage level measures for a particular organization (e.g., organization 108) or particular groups of users are lower, higher, or considered similar to the usage level measures of other organizations or other groups of users. These measures can also highlight various factors that are leading adoption behavior (e.g., based on the data associated with a highest specified portion, such as 10%, of the users).

In some implementations, the benchmark data 218 are aggregated usage measure levels for various other organizations that are similar to the particular organization (e.g., organization 108) for which the set of usage level measures 210 were determined. For example, the benchmark data 218 can be aggregated usage level measures for multiple different organizations that each are in the same industry as the particular organization, are of similar size as the particular organization, utilize similar types of user devices as the particular organization, are in a same geographic region as the particular organization, and/or have a similar type of workforce (e.g., teleworkers or traveling sales team). Using benchmark data 218 from organizations that are similar to the particular organization results in a relative usage measures 220 that reflect differences in the set of usage level measures 210 for the particular organization relative to similarly situated companies, which increases the likelihood that the relative usage measures 220 are accurate portrayals of whether the particular organization is obtaining an adequate amount of value from the communications features that they have purchased.

The analytics apparatus 114 can determine the relative usage level measures 220, for example, based on a comparison of the set of usage level measures 210 to the benchmark data 218. In some implementations, the comparison can be a ratio of a particular usage level measure form the set 210 relative to a corresponding usage level measure in the benchmark data 218. Other forms of comparison can also be used. For example, usage difference thresholds can be used to determine whether use by the particular organization is substantially different from that of similar organizations.

In a particular example, the usage difference thresholds can include a low threshold and a high threshold. The low threshold can be some specified amount below the benchmark data 218 (e.g., a specified percentage or absolute value), and if the usage level measure for the particular organization is below the low threshold, the usage level measure for the particular organization can be considered low (e.g., meaning that utilization of the communications feature by the particular organization is lower than that of similar organizations). The high threshold can be some other specified amount above the benchmark data 218 (e.g., a specified percentage or absolute value), and if the usage level measure for the particular organization is above the high threshold, the usage level measure for the particular organization can be considered high (e.g., meaning that utilization of the communications feature by the particular organization is higher than that of similar organizations).

The analytics apparatus 114 generates output data 222. In some implementations, the output data 222 includes report data 224 and/or suggest data 226. The report data 224 can include the set of usage level measures 210 and/or the relative usage level measures 220. The report data 224 can also include data that provide, for each of the communications features, a visual indication (e.g., a bar graph, line graph, or another graphical representation) of the usage level for the communications feature. For example, each usage level measure in the set 210, the benchmark data 218, and the relative usage level measure 220 can be graphically represented to enable an organization to quickly identify which communications features are being underutilized relative to the subscribed bundles, and by how much relative to the usage levels at other similar organizations that are subscribed to similar bundles.

The suggest data 226 can include information suggesting actions that can be taken by the organization in the event that one or more of the communications features are being underutilized, or if additional services should be recommended. For example, assume that a particular communications feature has been deemed underutilized by the particular organization. In this example, the analytics apparatus 114 can evaluate whether there is a technological issue that is hindering utilization of the communication feature (e.g., as evidenced by a high number of errors or poor response time in the data of the event logs). If there is a technological issue, the analytics apparatus 114 can include in the suggest data 226 information informing the organization of the technological issue and providing any suggestions for remedying the issue (e.g., downloading an updated version of mobile device operating system firmware). If, however, there is no technological issue is apparent from the event logs, it may be that providing the organization with suggested training materials may increase the utilization of a particular communications feature. In this example, the suggest data 226 can include information suggesting that the organization engage in training about the communications feature, and the analytics apparatus 114 (or another data processing apparatus) can provide instructional materials to the organization.

In some situations, an organization may have a relatively high utilization, but analysis of the usage data 202 by the analytics apparatus 114 may reveal that there is a small group of employees that are not utilizing a particular communications feature. In this situation, it may also be appropriate to provide the instructional materials discussed above.

In some implementations, the suggest data 226 and/or instructional materials that are provided to the organization can be selected based on historical data regarding the suggest data provided to other similar organizations and/or the instructional materials that were provided to the other similar organizations. For example, if the analytics apparatus 114 determines that a large number of other organizations in a same industry as the particular organization experienced a large increase in utilization after a particular set of instructional materials were provided to those organizations, then the analytics apparatus 114 can determine that it is appropriate to provide instructional materials to the particular organization.

In some implementations, the suggest data 226 provides a suggestion that the particular organization remove a particular communications feature from the communications services that are being provided to the particular organization (or to a subset of users in the organization, such as users in a particular job function). For example, in the event that a particular organization has a low, or zero, utilization rate, the analytics apparatus 114 may recommend removing a particular communications feature if a large portion of other organizations in a similar industry have a low utilization relative to that particular communications feature (or have removed the communications feature), there is no evidence that technological issues are preventing utilization of the feature, and/or instructional information previously provided to the organization did not substantially increase the utilization of the particular communications feature.

In some implementations, the suggest data 226 may suggest that the particular organization subscribe to a smaller (or larger) bundle of communications features based on the evaluation performed by the analytics apparatus 114. For example, if the set of communications features that are generally used by the particular organization are included in a lower priced bundle, while the underutilized features are not included in that lower priced bundle, it may be appropriate for the analytics apparatus 114 to suggest that the particular organization subscribe to the lower priced bundle. The decision to suggest the lower priced bundle may also be based on whether other organizations in the same industry as the particular organization are experiencing similar levels of utilization as the particular organization.

In some implementations, the analytics apparatus 114 can determine the suggest data 226 to be provided based on a machine learning model. For example, based on historical usage data for various organizations, the analytics apparatus 114 can learn relationships and patterns among various usage levels, organization sizes, types of organizations (e.g., as indicated by industry), changes in usage levels over time, and other information that is obtained and/or stored in the analytics data store 116. This model can then be applied to usage data for a particular organization, and the output can be a suggested set of communications features or course of action (e.g., provide instructional materials).

Figure 3:
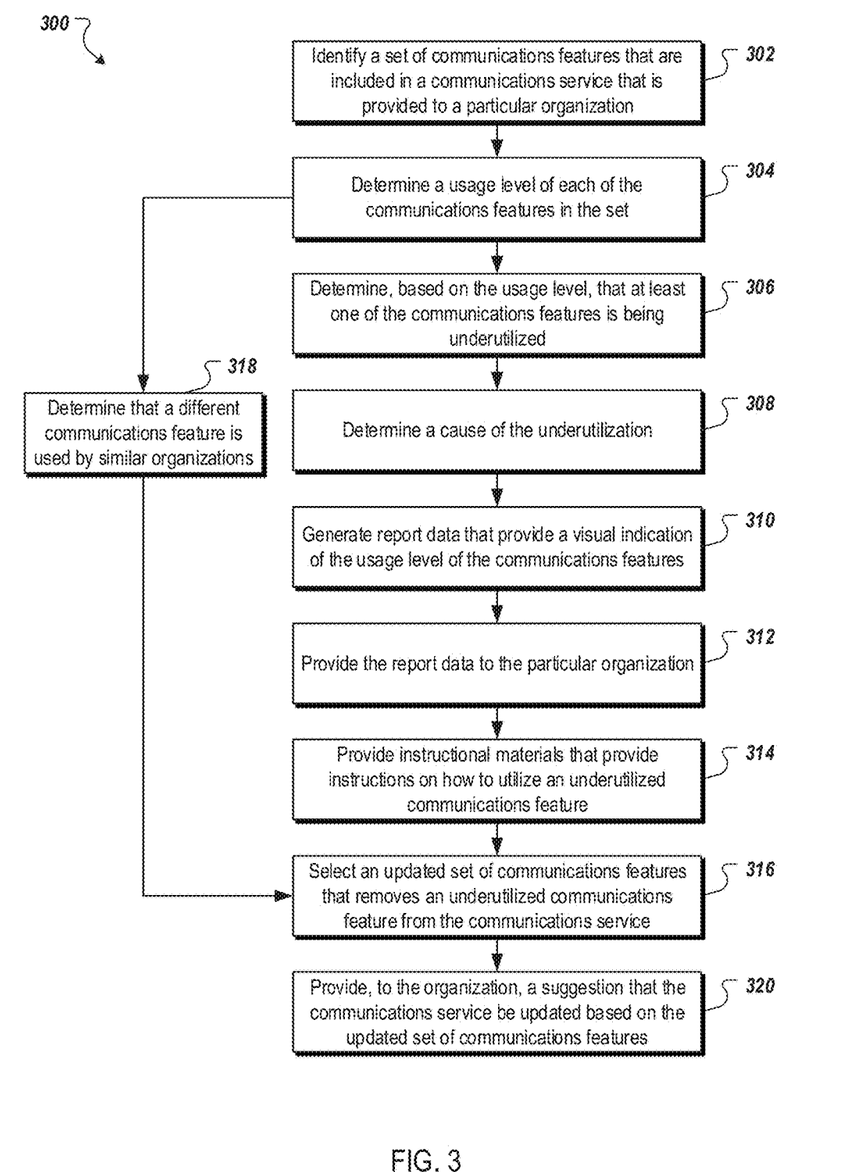
FIG. 3 is a flow chart of an example process for evaluating the utilization of communications features.

FIG. 3 is a flow chart of an example process 300 for evaluating the utilization of communications services. Operations of the process 300 can be performed, for example, by the analytics apparatus 114 of FIG. 1, or another data processing apparatus. Operations of the process 300 can also be implemented as instructions stored on a non-transitory computer readable medium, where the instructions cause one or more data processing apparatus to perform operations of the process 300. It is not necessary for all operations of the process 300 to be performed, or that the operations be performed in the order described. Additionally, two or more of the operations of the process 300 can be performed in parallel.

A set of communications features that are included in a communications service provided to a particular organization is identified (302). In some implementations, the set of communications features can be identified based on a service bundle that the particular organization has purchased. In some implementations, the set of communications features are obtained from a database that stores information specifying each communications feature that the organization has been authorized to use.

A usage level is determined for each of the communications features in the set (304). In some implementations, the usage level is determined on a periodic basis (e.g., daily, weekly, or monthly), and each periodic determination of the usage level for a particular communications feature represents the utilization of that particular communications feature over a specified time period. As discussed above with reference to FIG. 2 the determination of the usage level for each particular communications feature can include a determination of a total adoption rate for the particular communications feature, a periodic usage change for the particular communications feature, a peak usage, an average usage, and/or other usage level measures. These usage level measures can be determined on a per-organization basis, a per-device-type basis, a per-job-function basis, or per-bundle-basis.

In some implementations, the usage level for a particular communications feature is determined based on a portion of the members (or authorized users) of an organization that have utilized the particular communications feature for at least a specified amount of time or a specified number of different times. The specified amount of time (or number of different times) can be specified for a particular period (e.g., one week or one month), which can prevent organization members who only accessed a particular communications feature a limited number of times (e.g., once) from being considered to have utilized the communications feature.

At least one of the communications features is determined to be an underutilized communications feature based on the usage level (306). In some implementations, the determination that a particular communications feature is underutilized is based on the usage level of the particular communications feature being less than a specified level. For example, as discussed above with reference to FIG. 2, the usage level for a particular communications feature can be compared to benchmark data, and if the usage level is lower than (or at least a pre-specified amount lower than) the benchmark data, the particular communications feature can be considered to be an underutilized communications feature.

As discussed above, the determination that a particular communications feature can be based on an adoption rate (e.g., total adoption rate) of the particular communications feature. As discussed above with reference to FIG. 2, the total adoption rate 212 for a particular communications feature can be determined based on a number of users in the organization that have ever utilized the particular communications feature relative to (e.g., divided by) a total number of authorized users for that particular communications feature.

In some implementations, an industry adoption rate is identified for purposes of determining whether a particular communications feature is underutilized. The industry adoption rate specifies an aggregate adoption rate, or leading adoption rate, for other organizations that are in a same industry as the particular organization. For example, if the particular organization is an insurance company, the industry adoption rate may be an aggregate adoption rate for other insurance companies. If the adoption rate for the particular organization is determined to be less than the industry adoption rate, the determination can be made that the communications feature is an underutilized communications feature within the particular organization.

In some implementations, a particular communications feature can be identified as an underutilized feature based on a determination that more than a specified portion of the members (or authorized users) of the organization utilize the particular communications feature less than a specified amount. For example, in some situations, a particular communications feature may be identified as an underutilized communications feature if more than 50% (or some other specified portion) of the users authorized to use the communications feature have used the communications feature less than twice (or some other number of times) over a prior month (or some other specified period). In some implementations, identifying a particular communications feature as underutilized in this manner can be performed independent of the benchmark data.

A cause of the underutilization is determined (308). In some implementations, the cause of the underutilization can be determined, for example, based on event logs collected in conjunction with use of the communications features. For example, the event logs can include data such as error messages, response times, and other performance information corresponding to use of the communications feature.

For purposes of illustration, assume that the event logs include a large number of error messages corresponding to use of a particular communications feature, and that the event logs show that these error messages are followed by (e.g., according to timestamps) indications that users experiencing the errors stopped using the communications feature. In this example, it may be determined that a malfunction of the particular communications feature was the cause of the underutilization of the communications feature, and the malfunction can be reported to either the communications service provider and/or the organization. Additionally, a cause of the error messages may be investigated in an effort to increase utilization of the particular communications feature by the organization (e.g., upgrading device firmware). On the other hand, if there are no indications in the event logs that a malfunction of the particular communications feature has caused (or at least contributed to) the underutilization, then it may be determined that the underutilization stems from some other cause.

Report data that provide a visual indication of the usage level of the communications features are generated (310). As discussed above with reference to FIG. 2, the report data can include usage levels and/or the relative usage levels. The report data can also include data that provide, for each of the communications features, a visual indication (e.g., a bar graph, line graph, or another graphical representation) of the usage level for the communications feature.

The report data are provided to the particular organization (312). In some implementations, the report data are provided to a communications management application executed by the particular organization. In some implementations, the report data are provided to a server hosting a web interface through which the organization can access information about their communications services, including the report data. The report data can be generated to cause presentation of the visual indication of the usage levels of the communications features.

Instructional materials that provide instructions on how to use an underutilized communications feature are provided to the organization (314). In some implementations, the instructional materials can include a link to online training materials, such as instructional videos, interactive applications, documents, or other materials that provide information on how to configure a device to utilize a particular communications feature or how to use various functions of the communications feature. The instructions materials can be provided, for example, prior to suggesting any changes to the set of communications features that are provided to the organization.

An updated set of communications features that removes an underutilized communications feature from the communications service is selected (316). In some implementations, the updated set of communications features is selected based, at least in part, on the determination that at least one of the communications features is an underutilized communications feature. For example, in response to determining that a particular communications feature is underutilized, the underutilized communications feature can be removed from the set of communications features to create the updated set of communications features. In some implementations, the removal of an underutilized communications feature from the set of communications features is conditioned on the communications feature continuing to be underutilized for at least a specified amount of time following correction of any malfunctions that may have been contributing to the underutilization and/or following the providing of the instructional materials.

In some implementations, one or more additional communications features (e.g., a communications feature that was not included in the set of communications features) are selected to be included in the updated set of communications features. For example, assume that a determination is made that a different communications feature, not included in the communications service provided to the particular organization, is being utilized by more than at least a threshold number (or portion) of organizations that are similar to the particular organization (e.g., similar by being in a same industry as the particular organization, similar size as the particular organization, etc.) (318).

In this example, the fact that other similar organizations are utilizing the different feature is an indication that the different feature may be of value to the particular organization. Therefore, the different communications feature may be selected for inclusion in the updated set of communications features. Note that the different communications feature can be identified and included in an updated set of communications feature that are suggested to the organization independent of whether an underutilized communications feature has been identified.

A suggestion is provided to the organization to change their communications service based on the updated set of communications features (320). The suggestion can be provided, for example, in communications management application executed by the particular organization or a web interface through which the organization can access information about their communications services. The suggestion can also be provided by way of e-mail, voicemail, or any other manner of communicating the suggestion. In some implementations, the set of communications features provided to the organization are changes based on the selected setoff updated communications features, either automatically or in response to the organization requesting a change to the communications features based on the suggestion. In some implementations, the suggestion is provided by generating data that specify the suggestion and/or cause presentation of the suggestion at a computing device. In some implementations, the suggestion can be provided by generating data that changes the set of communications features provided to the particular organization based, at least in part on the updated set of communications features.

Figure 4:
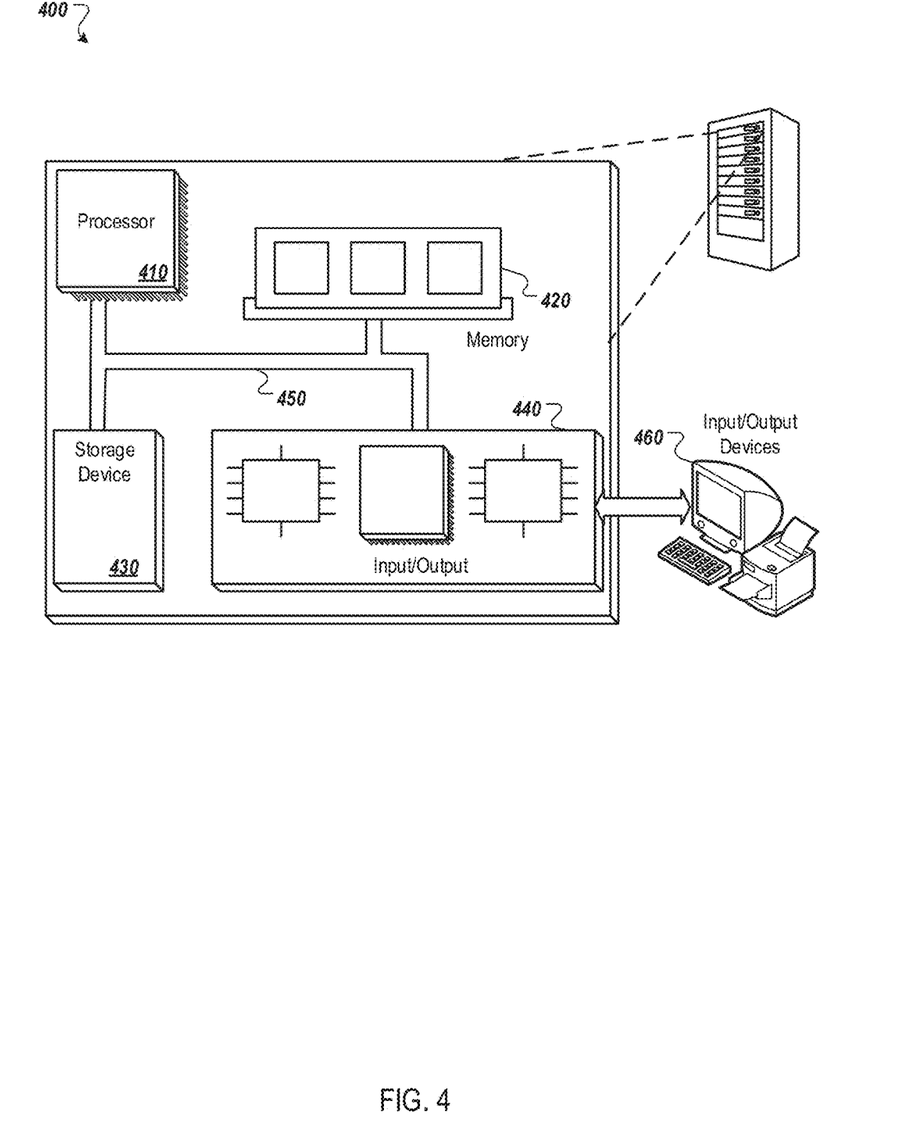
FIG. 4 is a block diagram of an example computer system.

FIG. 4 is an example computing system that can perform any of the operations discussed above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatus, the method comprising:
    using a communication platform comprising a server that executes a communications application, providing communication services of a communication service provider to a plurality of devices that are segmented into a plurality of organizations;
    identifying, for a particular organization of the plurality of organizations, a set of communications features that are included in a communications service that is provided to the particular organization;
    using an analytics apparatus, determining, for a time period and for each of one or more communications features in the set of communications features, a usage level of each of the one of more communications features by one or more devices of the particular organization,
    wherein determining the usage level of the communications features comprises any one or more of determining a total adoption rate for the communications features, a period usage change for the communications features, a peak use for the communications features, and an average usage for the communications features;
    storing, using the analytics apparatus, usage data corresponding to use of each of the one or more communications features, for each of the one or more devices and for each of the plurality of organizations, in a data store;
    determining, using the analytics apparatus, whether a malfunction selected from the group consisting of performance of the one or more devices, performance of a communication server, and performance of a network exists for any of the one or more communication features by accessing an event log;
    if a malfunction exists for any of the one or more communication features, continuing to provide the one or more communication features for a specified period of time;
    determining using the analytics apparatus, based on the usage level of at least one of the one or more communications features being less than a specified level, that the at least one of the communications features is being underutilized;
    selecting, by one or more computers and based on the determination that the at least one of the communications features is being underutilized, an updated set of communications features that removes the at least one of the communications features from the communications service that is provided to the particular organization, wherein selecting the updated set of communications features, further comprises use of a database comprising historical data related to providing communications features to similar organizations;

comparing using the analytics apparatus, the usage data to benchmark data;

generating, by one or more computers, data that automatically changes the set of communications features provided to the particular organization based, at least in part on the updated set of communications features;

reporting the malfunction to the communication service provider and to the particular organization; and using the server, automatically changing the one or more communication features for the particular organization.

2. The method of claim 1, comprising:

generating report data, for each of the one or more communications features, that cause presentation of a visual indication of the usage level of the communications feature; and providing the report data to the particular organization.

3. The method of claim 1, wherein:

determining a usage level further comprises determining, for a particular communications feature, a portion of the one or more devices of the particular organization that have utilized the particular communications feature at least a specified amount of time; and determining that the at least one of the communications features is underutilized comprises determining that the particular communications feature is underutilized based on a determination that more than a specified portion of the one or more devices of the particular organization utilize the particular communications feature less than the specified amount.

4. The method of claim 3, further comprising providing, prior to selecting the updated set of communications features and based on the determination that the particular communications feature is used less than the specified amount, instructional materials that provide instructions on how to utilize the particular communications feature.

5. The method of claim 1, wherein determining that the at least one of the communications features is underutilized comprises:

determining, for the particular organization, an adoption rate of a particular communications feature;

identifying, for the particular communications feature, an industry adoption rate specifying an aggregate adoption rate for other organizations that are in a same industry as the particular organization; and determining, based on the adoption rate being less than the aggregate adoption rate, that the particular communications feature is underutilized by the particular organization.

6. The method of claim 5, further comprising:

determining that the underutilization of the particular communications feature is due to a malfunction that results from a network not supporting one or more communications features in the set of communications features.

7. The method of claim 1, further comprising:

determining that one or more communications features, not included in the communications service provided to the particular organization, are utilized by more than at least a threshold number of other organizations that are one or more of in the same industry and in the same geographical region of the particular organization; and suggesting, for inclusion in the communications service provided to the particular organization, at least one of the one or more communications features.

8. A non-transitory computer storage medium encoded with a computer program, the program comprising instructions that when executed by one or more data processing apparatus cause the one or more data processing apparatus to perform operations comprising:

using a communication platform comprising a server that executes a communications application, providing communication services of a communication service provider to a plurality of devices that are segmented into a plurality of organizations;

identifying, for a particular organization of the plurality of organizations, a set of communications features that are included in a communications service that is provided to the particular organization;

determining, for a time period and for each of one or more communications features in the set, a usage level of the communications features by one or more devices of the particular organization, wherein determining the usage level of the communications features comprises any one or more of determining a total adoption rate for the communications features, a period usage change for the communications features, a peak use for the communications features, and an average usage for the communications features;

storing, in a data store, usage data corresponding to use of each of the one or more communications features for each of the one or more devices and for each of the plurality of organizations;

determining whether a malfunction selected from the group consisting of performance of the one or more devices, performance of a communication server, and performance of a network exists for any of the one or more communication features by accessing an event log;

if a malfunction exists for any of the one or more communication features, continuing to provide the one or more communication features for a specified period of time;

determining, based on the usage level of at least one of the one or more communications features being less than a specified level, that the at least one of the communications features is being underutilized;

selecting, based on the determination that the at least one of the communications features is being underutilized, an updated set of communications features that removes the at least one of the communications features from the communications service that is provided to the particular organization, wherein selecting the updated set of communications features, further comprises use of a database comprising historical data related to providing communications features to similar organizations;

comparing using the analytics apparatus, the usage data to benchmark data; and generating data that automatically changes the set of communications features provided to the particular organization based, at least in part on the updated set of communications features;

reporting the malfunction to the communication service provider and to the particular organization; and using the server, automatically changing the one or more communication features for the particular organization.

9. The computer storage medium of claim 8, wherein the instructions cause the one or more data processing apparatus to perform operations comprising:
  generating report data, for each of the one or more communications features that cause presentation of a visual indication of the usage level of the communications feature; and
  providing the report data to the particular organization.

10. The computer storage medium of claim 8, wherein:
  determining a usage level further comprises determining, for a particular communications feature, a portion of the one or more devices of the particular organization that have utilized the particular communications feature at least a specified amount of time; and
  determining that the at least one of the communications features is underutilized comprises determining that the particular communications feature is underutilized based on a determination that more than a specified portion of the one or more devices of the particular organization utilize the particular communications feature less than the specified amount.

11. The computer storage medium of claim 10, wherein the instructions cause the one or more data processing apparatus to perform operations further comprising providing, prior to selecting the updated set of communications features and based on the determination that the particular communications feature is used less than the specified amount, instructional materials that provide instructions on how to utilize the particular communications feature.

12. The computer storage medium of claim 8, wherein determining that the at least one of the communications features is underutilized comprises:
  determining, for the particular organization, an adoption rate of a particular communications feature;
  identifying, for the particular communications feature, an industry adoption rate specifying an aggregate adoption rate for other organizations that are in a same industry as the particular organization; and
  determining, based on the adoption rate being less than the aggregate adoption rate, that the particular communications feature is underutilized by the particular organization.

13. The computer storage medium of claim 12, wherein the instructions cause the one or more data processing apparatus to perform operations further comprising:
  determining that the malfunction is due to the particular communications feature not supported by the one or more of the devices.

14. A system comprising:
  a data store storing utilization data related to user utilization of various communications features; and
  one or more computers that interact with the data store and execute instructions that cause the one or more computers to perform operations comprising:
    using a communication platform comprising a server that executes a communications application, providing communication services of a communication service provider to a plurality of devices that are segmented into a plurality of organizations;
    identifying, for a particular organization of the plurality of organizations, a set of communications features that are included in a communications service that is provided to the particular organization;
    determining, for a time period and for each of one or more communications features in the set, a usage level of the communications features by one or more devices of the particular organization,
    wherein determining the usage level of the communications features comprises any one or more of determining a total adoption rate for the communications features, a period usage change for the communications features, a peak use for the communications features, and an average usage for the communications features;
    storing usage data corresponding to use of each of the one or more communications features for each of the one or more devices and for each of the plurality of organizations, in the data store;
    determining whether a technical malfunction selected from the group consisting of performance of the one or more devices, performance of a communication server, and performance of a network exists for any of the one or more communication features by accessing an event log;
    if a malfunction exists for any of the one or more communication features, continuing to provide the one or more communication features for a specified period of time;
    determining, based on the usage level of at least one of the one or more communications features being less than a specified level, that the at least one of the communications features is being underutilized;
    selecting, based on the determination that the at least one of the communications features is being underutilized, an updated set of communications features that removes the at least one of the communications features from the communications service that is provided to the particular organization,
    wherein selecting the updated set of communications features, further comprises use of a database comprising historical data related to providing communications features to similar organizations;
    comparing using an analytics apparatus, the usage data to benchmark data;
    generating data that automatically changes the set of communications features provided to the particular organization based, at least in part on the updated set of communications features;
    reporting the malfunction to the communication service provider and to the particular organization; and
    using the server, automatically changing the one or more communication features for the particular organization.

15. The system of claim 14, wherein the instructions cause the one or more computers to perform operations comprising:
  generating report data, for each of the one or more communications features that cause presentation of a visual indication of the usage level of the communications feature; and
  providing the report data to the particular organization.

16. The system of claim 14, wherein:
  determining a usage level further comprises determining, for a particular communications feature, a portion of the one or more devices of the particular organization that have utilized the particular communications feature at least a specified amount of time; and
  determining that the at least one of the communications features is underutilized comprises determining that the particular communications feature is underutilized based on a determination that more than a specified portion of the one or more devices of the particular organization utilize the particular communications feature less than the specified amount.

17. The system of claim 16, wherein the instructions cause the one or more computers to perform operations further comprising providing, prior to selecting the updated set of communications features and based on the determination that the particular communications feature is utilized less than the specified amount, instructional materials that provide instructions on how to utilize the particular communications feature.

18. The system of claim 14, wherein determining that the at least one of the communications features is underutilized comprises:
   determining, for the particular organization, an adoption rate of a particular communications feature;
   identifying, for the particular communications feature, an industry adoption rate specifying an aggregate adoption rate for other organizations that are in a same industry as the particular organization; and
   determining, based on the adoption rate being less than the aggregate adoption rate, that the particular communications feature is underutilized by the particular organization.

19. The system of claim 18, wherein the instructions cause the one or more computers to perform operations further comprising:
   determining that the underutilization of the particular communications feature is due to a malfunction of the particular communications feature within the particular organization; and
   generating and transmitting data that report the malfunction.

20. The system of claim 14, wherein the instructions cause the one or more computers to perform operations further comprising:
   determining that one or more communications features, not included in the communications service provided to the particular organization, are utilized by more than at least a threshold number of other organizations that are one or more of in the same industry and in the same geographical region of the particular organization; and
   suggesting, for inclusion in the communications service provided to the particular organization, at least one of the one or more communications features.

* * * * *